United States Patent
Bauer

[15] 3,688,595
[45] Sept. 5, 1972

[54] INFINITELY VARIABLE CHAIN-ENGAGED GEARING

[72] Inventor: Johannes Bauer, Lindenstrasse 55, 221 Itzehoe, Germany

[22] Filed: Nov. 9, 1970

[21] Appl. No.: 87,999

[30] Foreign Application Priority Data

Nov. 22, 1969   Germany..........P 19 58 687.9

[52] U.S. Cl..................................74/230.17 S
[51] Int. Cl................................F16h 55/52
[58] Field of Search.........................74/230.17 S

[56] References Cited

UNITED STATES PATENTS

| 3,049,933 | 8/1962 | Besel | 74/230.17 S |
| 3,071,020 | 1/1963 | Maurer et al. | 74/230.17 S |

FOREIGN PATENTS OR APPLICATIONS

| 840,772 | 7/1960 | Great Britain | 74/230.17 S |
| 1,122,795 | 1/1962 | Germany | 74/230.17 S |

*Primary Examiner*—C. J. Husar
*Attorney*—Beaman & Beaman

[57] ABSTRACT

The gearing consists of two pairs of toothed bevel discs with each pair being mounted on a shaft. A link chain engages both pairs of discs for power transmission between the shafts. Two tooth bolts are transversely displaceably supported in bores provided in each link in a way that they may be displaced with pressure directed inwardly on their tooth ends and are locked by pressure directed from other directions on the tooth ends. This is obtained by bores which closely fit the bolt on one side and are enlarged with respect to the bolt diameter on the other side of the link.

14 Claims, 8 Drawing Figures

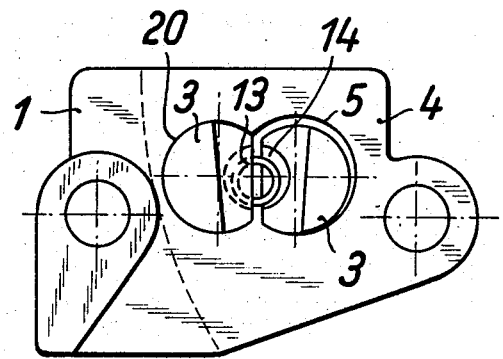
Fig. 7
Fig. 8
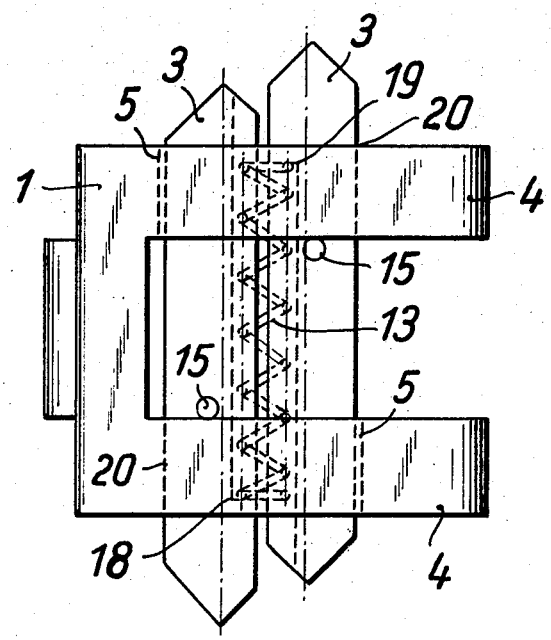

3,688,595

INFINITELY VARIABLE CHAIN-ENGAGED GEARING

BACKGROUND OF THE INVENTION

The invention relates to an infinitely variable chain-engaged gearing with radially toothed bevel discs in which each tooth of one bevel disc is respectively arranged opposite a tooth space of the opposite bevel disc. The chain consists of links with bores extending transversely to the travelling direction of the chain and tooth bolts displaceably supported in the bores, said tooth bolts being adapted to engage within the teeth of the pairs of bevel discs for power transmission.

The invention is also applicable to chains having laminas instead of round bolts. In the embodiment shown, partly flattened rotatable bolts are used, thus taking advantages of the round bolts and laminas alike. Teeth with flat angles of yaw, though not having any self-locking effect between the teeth of the bolts and the teeth of the bevel discs, make available longer tooth surfaces of engagement, so that the tooth bolts may be designed stronger as compared with the most commonly used laminas. One end of the tooth bolts nearly always engages between the teeth of the bevel discs and become effective in the pulling direction.

With this type of gearing the obtuse angles of the tooth flanks result in the danger that the tooth bolts may axially evade the teeth of the bevel discs so that a chain slippage results.

The tooth bolts are desired to be easily axially displaceable during initial engagement of the chain with the pairs of bevel discs but must not displace after complete engagement with the discs.

SUMMARY OF THE INVENTION

According to the invention the tooth bolts are supported at either end in the chain links with one supporting bore for each bolt having an exact fit, however, still allowing for easy displacement of the bolt. The bore on the opposite side of the chain link is designed to be wider than the tooth bolt so that the tooth bolt is able to slightly move radially therein. This radial movement is limited in a direction towards the interior of the chain loop by displacing the wider bore outwardly from the closer fitting bore to such a degree that the innermost walls of both bores are in alignment with each other.

That means that the end of the tooth bolt may be displaced in the close fitting bore during the initial engagement of the chain between the bevel discs until the other end comes to exert a pressure on the tooth flank of the opposite bevel disc and then, the bolt is urged outwardly and against the direction of rotation or outwardly and in the direction of rotation, so that the bolt binds in the closely fitting bore and can no longer be axially displaced. A prerequisite for this is that the bolts prior to being received between the bevel discs are displaced towards the side of the closely fitting bores. This displacement may be obtained by guide rails or by inserted springs.

A chain is known wherein the laminas during the initial engagement of the chain are clamped tight via cams and curvatures by the inflexion of the chain links. But as the inflexion of the chain links takes place at a moment when the laminas have not yet come to lie close to the bevel discs with both their ends, a final displacement of the laminas must take place by a strong pressure. The efficiency, the power transmitted and the wear are thereby impaired. However, with the gearing of the invention, the tooth bolts are not clamped tight also until also their second ends contact the opposite bevel disc and the displacement has been completed.

BRIEF DESCRIPTION OF THE DRAWING

The drawing shows by way of example two embodiments of the invention. In the drawing, FIG. 7 is a side view of a chain link, the tooth bolts of which are brought into their pre-disc engagement position by a spring instead of a guide rail, and FIG. 8 shows a plan view of the chain link shown in FIG. 7.

In the following, the subject matter of the invention will be described in more detail by way of the drawings.

DESCRIPTION OF THE PREFERRED EMBODIMENTS

Figure 1:
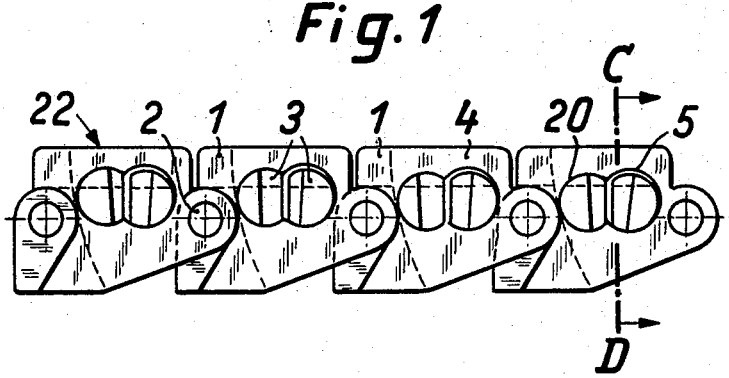
FIG. 1 is a side view of a portion of a drive chain constructed in accordance with the invention.
Figure 2:
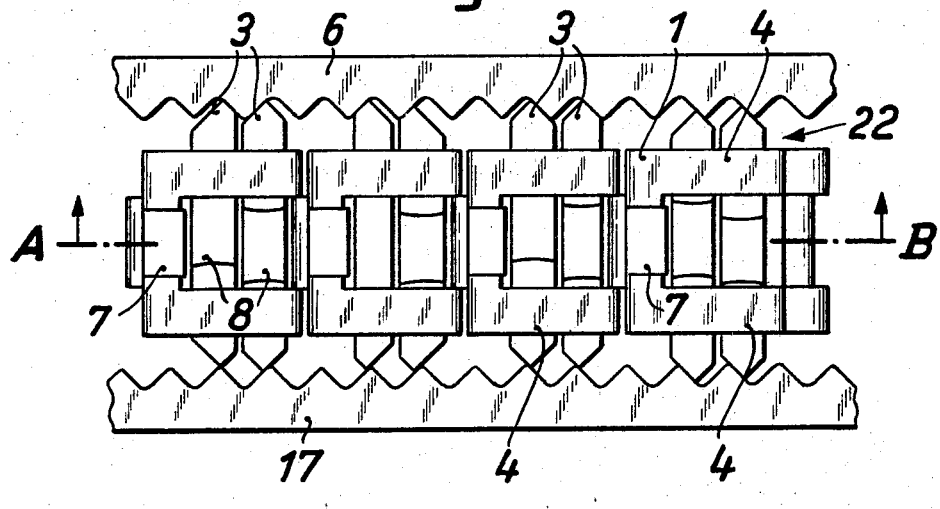
FIG. 2 is a detail plan view of the chain with tooth bolts engaging within the teeth of portions of the two corresponding bevel discs.
Figure 5:
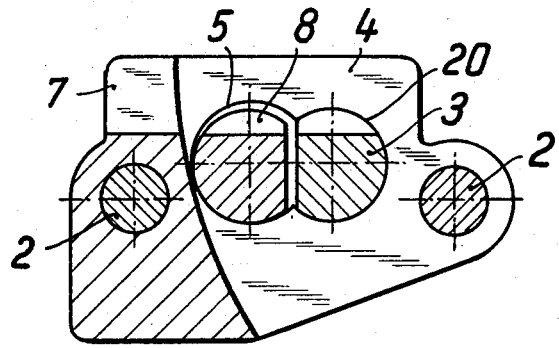
FIG. 5 is a sectional view of one single chain link as taken along line A–B of FIG. 2.
Figure 6:
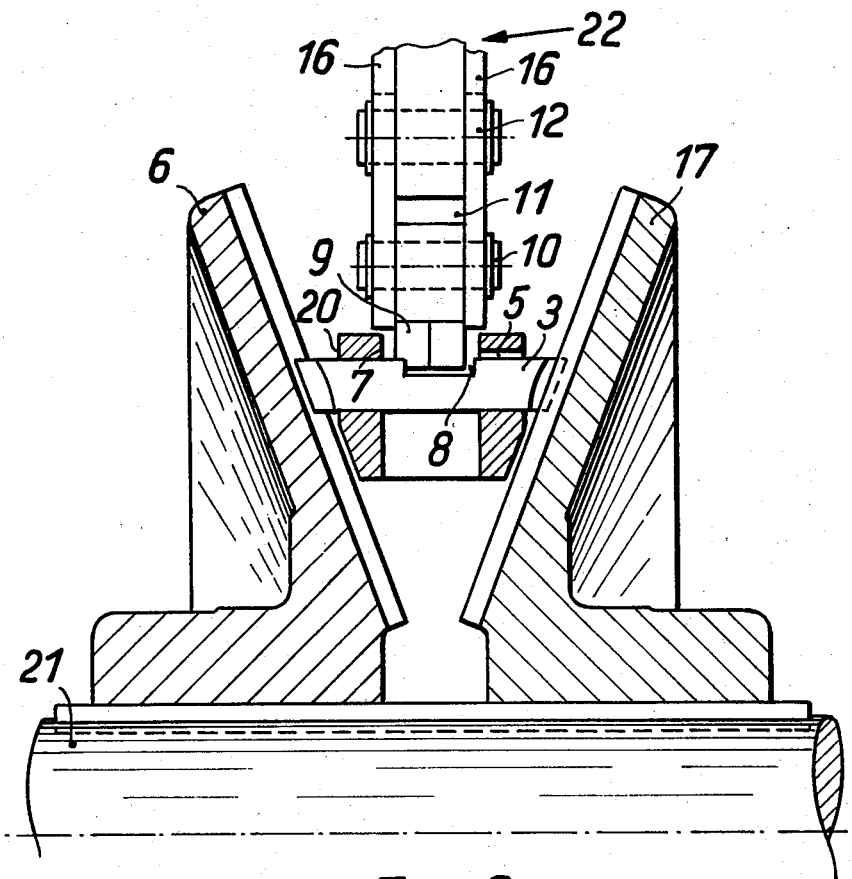
FIG. 6 is a sectional view of a pair of bevel discs including a sectional view taken on the chain along line C–D of FIG. 1, and a view of the guide rail with movable suspension taken in the direction of the arrow E of FIG. 4.

The chain referenced generally 22 in FIGS. 1 and 2 consists of links 1 which are formed of one piece and chain bolts 2 flexibly interconnecting the links and the tooth bolts 3, two of which are supported in bores 5, 20 provided therefore in each chain link 1. The bores 5, 20 for the tooth bolts 3 are disposed in the legs 4 of the U-shaped links 1 (please see FIG. 2) so that the tooth bolts are doubly supported. For this purpose there is respectively provided one bore 20 having a close fit which permits an easy axial displacement of the associated bolt 3, while the bore 5 supporting the other end of the bolt has some play. The center of this bore 5 is staggered outwardly with respect to the closely fitting bore 20 by half the difference of the two bore diameters, which means in FIGS. 1 and 5 upwardly, so that the lower edges of the two bores are in alignment with each other.

A pressure exerted from above on the tooth bolt 3 at the end of the enlarged bore 5 results in an axial displacement of the tooth bolt. If the bolts at the same end are subjected to a pressure from below and/or to a lateral pressure, the bolts at the other end will find and become jammed in the closely fitting bore. One of the two tooth bolts 3 present in a chain link 1 has its enlarged bore 5 in one leg of the link and the other bolt has its enlarged bore 5 in the other leg of this chain link, the closely fitting bores 20 are likewise each disposed in opposite legs. The bores of the two bolts 3 are disposed so close to one another that they intersect each other with their cylindrical surfaces, and the bolts therefore are flattened at the sides opposing each other. A sufficient amount of play is left between the flattened sides of the two bolts so that they may also slightly turn during displacement and may match with the tooth flanks of the bevel gears 6 and 17, but are prevented from further rotation.

Figure 3:
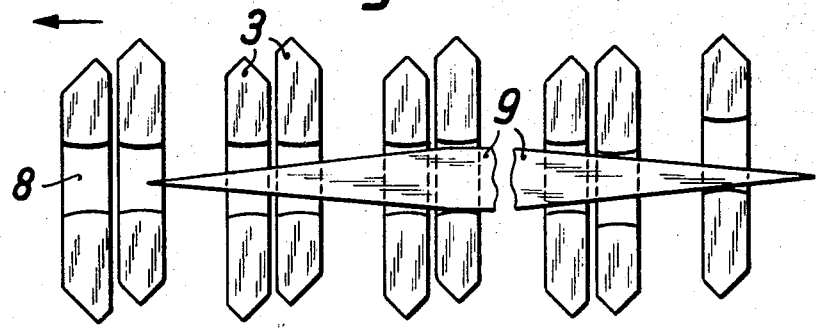
FIG. 3 shows the tooth bolts of FIG. 2, at the left hand side in the pre-disc engagement position controlled by a guide rail and at the right hand side in an outgoing position left by the tooth engagement.

The chain links 1 are provided with milled recesses 7 and the tooth bolts 3 are provided with milled recesses 8. Guide rails 9 are adapted to slide in these recesses 8 as the links pass between opposed disc pairs bringing the tooth bolts 3 into a proper pre-disc engagement position between the pairs of the bevel discs. Thus during the engagement of the chain with the bevel discs, the tooth bolts 3 project from the leg provided with the closely fitting bore 20 so that bolt axial displacement always takes place only towards the leg having the wider bore 5. In this arrangement, the projecting end of the bolts will always first contact the bevel discs and will be urged outwards thereby, that is upwardly in FIGS. 1 and 5, thus urging other the there end of the bolt in the wider bore downwardly against the wall of the wider bore 5 which is aligned with the other bore in this leg. In this case the bolts displace themselves axially until both ends lie close to the pair of bevel discs and the self-locking begins in the closely fitting bore 20. To insure that the ends of the tooth bolts project from the leg with the respective closely fitting bore during the disc engaging motion, the recesses 8 in the bolts 3 are correspondingly staggered with respect to the center of the bolts' length so that when the recesses 8 have moved along the guide rail 9 the bolts 3 will be correspondingly displaced (FIG. 3). The two guide rails 9 are pointed at both ends and are disposed midway between the two bevel discs 6 and 17. The rails have a maximum width which, while allowing the necessary sliding movement of the bolts, is only slightly less than the width of the recesses 8 of the tooth bolts.

The bevel discs 6, 17 are non-rotatably fixed on a shaft 21 in a manner to be capable of axial movement and are drivingly connected with a second pair of bevel discs 23 arranged in the same manner on another shaft extending in parallel with the shaft 21. The ratio between the two shafts can be infinitely adjusted by axial displacement of at least one gear of each of the two pairs of bevel discs in a manner known, per se, with aid of a known adjusting mechanism. The adjusting mechanism is not shown because it is not object of the invention.

Figure 4:
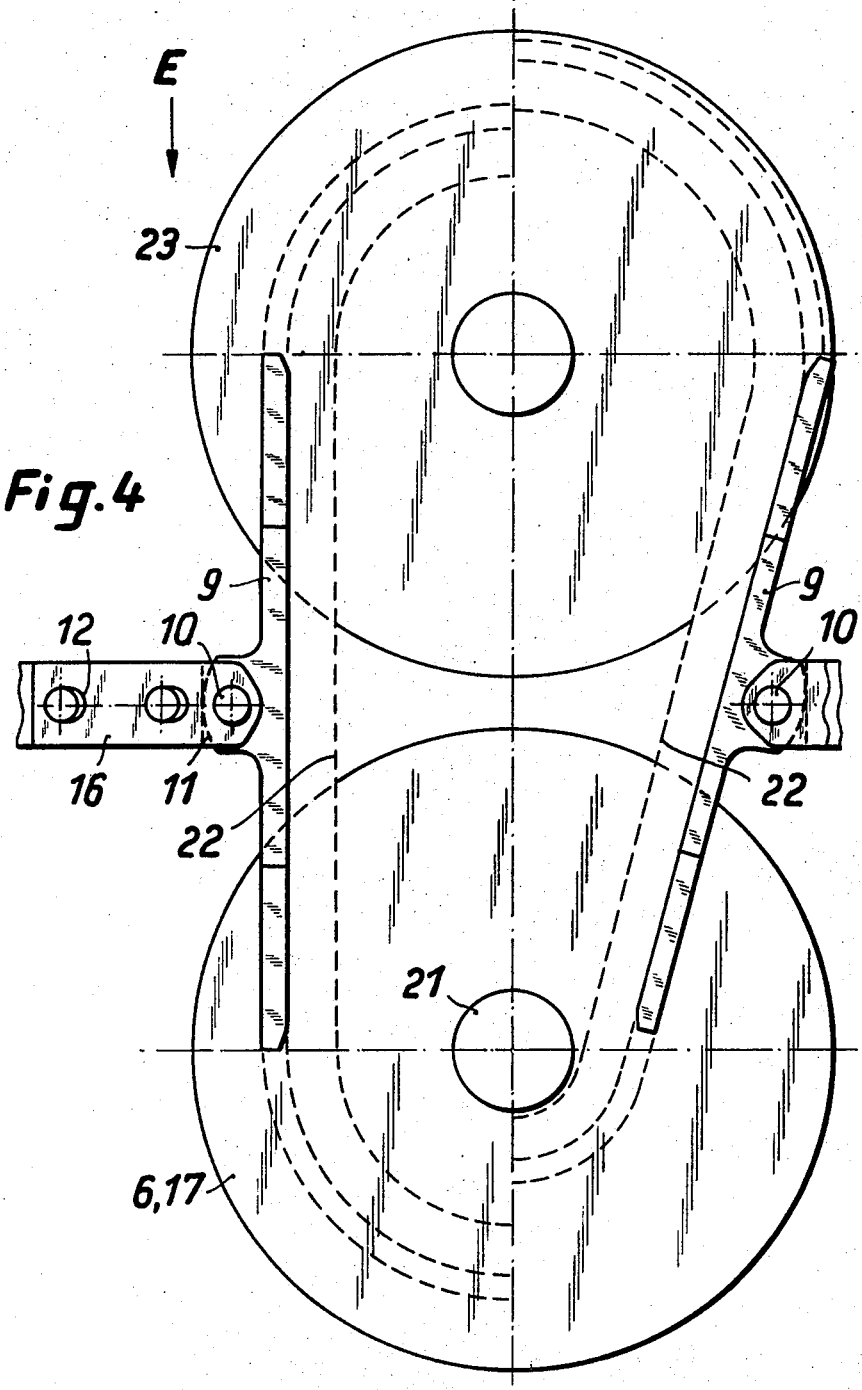
FIG. 4 is a view taken of two bevel discs with a chain indicated in two different ratios and with two guide rails in the corresponding positions.

As the guide rails 9 have to execute two different movements with the adjustment of the bevel discs, in accordance with FIG. 4, there is provided on the one hand a pivotal point 10 and, on the other hand, it is possible to displace the rails 9 through the curvature 11 in a direction towards the chain in the slots 12 of mounting 16, in addition to the angular adjustment about the pivotal point 10. By this, the change in the position of the pivotal points 10 has been taken into account, which change is caused by another oblique position of the chain which changes in the ratio.

The displacement of the tooth bolts 3 into their pre-disc engagement position may also take place by springs inserted as shown in FIGS. 7 and 8. These springs have one longitudinal half thereof seated in the two bolts 3 of a chain link 1. For this purpose, the bolts are provided with semi-bores 14 beginning near the bolt ends supported in closely fitting bore 20 and extending longitudinally outwardly to the ends of the widened bores 5.

The semi-bores 14 are terminated by shoulders at 18 and 19, so that the spring 13 may be supported at these shoulders 18, 19. Both bolts are forced in opposite directions against the abutments 15. In this embodiment, the milled recesses 7 and 8 shown in FIG. 2 and the guide rails 9 shown in FIGS. 3 and 4 are eliminated.

As the axial displacements of the tooth bolts 3 into the pre-disc engagement position must not be smaller than the tooth depths of the bevel discs and, on the other hand, too great a displacement would bring about an unnecessary pushing-back, the recesses 8 are offset from the center of the bolts 3 by half the tooth depth. In the embodiment with the inserted springs 13, the abutments 15 are likewise positioned in such a manner that the tooth bolts 3 when engaging between the bevel discs may reach the full tooth depth.

Too small a displacement of the bolts in the most unfavorable case might allow the bolt ends arranged in the enlarged bore first to contact the teeth of the bevel discs and cause a self-locking effect in the closely fitting bore. Then it would no longer be possible for the tooth bolts to adjust themselves between the bevel discs.

What I claim is:

1. An infinitely variable chain transmission comprising, in combination, first and second pairs of discs mounted upon first and second shafts, respectively, said discs each having a concentric beveled surface having radially extending teeth defined thereon and the beveled surface and teeth of each pair of discs being in spaced opposed relation, a link chain comprising a plurality of interconnected links engaging and drivingly interconnecting said pairs of discs, a first bore defined in said links transversely disposed to the length of said chain, a second bore defined in said links transversely disposed to the length of said chain and in alignment with said first bore, an elongated bolt within each of said bores transversely extending from said links and closely axially slidably received within said first bore and loosely received within said second bore, and a tooth defined at each end of said bolts whereby initial engagement of said bolts' toothed ends with the teeth of a pair of said discs axially displaces said bolts to align the bolts between said pair of discs and subsequent bending forces imposed on the end of said bolts adjacent said second bore binds and lock said bolts within said first bores against axial displacement within said bores.

2. In an infinitely variable transmission as in claim 1 wherein the innermost portions of said first and second bores with respect to the closed chain configuration are in alignment wherein forces exerted on said bolts inwardly toward said innermost portions are prevented from bending and binding said bolts.

3. In an infinitely variable transmission as in claim 1 wherein a pair of first bores and a pair of second bores are defined in each chain link defining first and second sets of bores, a bolt received within each set of first and second bores, said first bore of said first set being adjacent to and offset from said second bore of said second set.

4. In an infinitely variable transmission as in claim 3 wherein said bores and bolts are of a cylindrical transverse cross section and the surfaces of adjacent bores of said sets intersect each other, said bolts mounted in a common link each having a flattened side, said flattened sides being in spaced, opposed relation to each other limiting rotation of said bolts about their axes and permitting sufficient bolt rotation to permit alignment of the bolt toothed ends with the teeth defined on said discs.

5. In an infinitely variable transmission as in claim 1, a recess defined in each of said bolts intermediate the ends thereof, a guide rail mounted intermediate said pairs of discs received within said bolt recesses axially positioning said bolts prior to engagement of said bolts with said discs, and adjustable support means supporting said guide rail.

6. In an infinitely variable transmission as in claim 1, spring means biasing said bolts in the axial direction toward said first bore, and stop means limiting axial movement of said bolts under the influence of said spring means.

7. In an infinitely variable transmission as in claim 4, longitudinal semi-bores defined in the flattened side of each of said bolts within a common link, a compression spring mounted within said semi-bores biasing the associated bolts in the axial direction of its associated first bore, and stop means limiting axial movement of said bolts under the influence of said spring.

8. In an infinitely variable transmission as in claim 1 wherein at least one of said discs of each pair of discs is axially adjustable upon its associated shaft.

9. An infinitely variable chain transmission comprising, in combination, first and second pairs of discs mounted upon first and second shafts, respectively, said discs each having a concentric beveled surface having radially extending teeth defined thereon and the beveled surface and teeth of each pair of discs being in spaced opposed relation, a link chain comprising a plurality of interconnected links engaging and drivingly interconnecting said pairs of discs, said chain links being of a U configuration having first and second legs, first and second sets of cylindrical bores defined in each of said links, said first set of bores including a first bore defined in said first leg and a second bore defined in said second leg, said second set of bores including a first bore defined in said second leg and a second bore defined in said first leg, said bores being transversely disposed to the length of said chain, said second bores having a larger diameter than said first bores and being in alignment with said first bore of the same set, an elongated cylindrical bolt within each set of bores transversely extending from the associated link and closely axially slidably received within its associated first bore and loosely received within its associated second bore, and a tooth defined at each end of said bolts whereby initial engagement of said bolts' toothed ends with the teeth of a pair of said discs axially displaces said bolts to align the bolts between said pair of discs and subsequent bending forces imposed on the end of said bolts adjacent said second bore binds and lock said bolts within said first bores against axial displacement within said bores.

10. In an infinitely variable transmission as in claim 9 wherein the innermost portions of said first and second bores with respect to the closed chain configuration are in alignment wherein forces exerted on said bolts inwardly toward said innermost portions are prevented from bending and binding said bolts.

11. In an infinitely variable transmission as in claim 9 wherein the surfaces of said first and second bores defined in a common leg intersect each other, said bolts mounted in a common link each having a flattened side, said flattened sides being in spaced, opposed relation to each other limiting rotation of said bolts about their axes and permitting sufficient bolt rotation to permit alignment of the bolt toothed ends with the teeth defined on said discs.

12. In an infinitely variable transmission as in claim 9, a recess defined in each of said bolts intermediate the ends thereof, a guide rail mounted intermediate said pairs of discs received within said bolt recesses axially positioning said bolts prior to engagement of said bolts with said discs, and adjustable support means supporting said guide rail.

13. In an infinitely variable transmission as in claim 11, longitudinal semi-bores defined in the flattened side of each of said bolts within a common link, a compression spring mounted within said semi-bores biasing the associated bolts in the axial direction of its associated first bore, and stop means limiting axial movement of said bolts under the influence of said spring.

14. In an infinitely variable transmission as in claim 9 wherein at least one of said discs of each pair of discs is axially adjustable upon its associated shaft.

* * * * *